United States Patent [19]

Fannon et al.

[11] Patent Number: 5,074,676
[45] Date of Patent: Dec. 24, 1991

[54] ROD GUIDE MEMBER

[75] Inventors: Joseph P. Fannon, Washington; Darryl Marbury, Detroit, both of Mich.

[73] Assignee: General Motors Corporation, Detroit, Mich.

[21] Appl. No.: 623,322

[22] Filed: Dec. 6, 1990

[51] Int. Cl.⁵ .............................................. F16C 29/02
[52] U.S. Cl. ........................................ 384/10; 384/42
[58] Field of Search ..................... 384/10, 42, 37, 41, 384/23, 38

[56] References Cited

U.S. PATENT DOCUMENTS 3,720,449 3/1973 Godin .................................. 384/10
4,138,176 2/1979 Cowdroy ............................ 384/23
4,705,491 11/1987 Andersson .......................... 384/10
4,761,081 8/1988 Mulford .............................. 384/42

Primary Examiner—Lenard A. Footland
Attorney, Agent, or Firm—Herbert Furman

[57] ABSTRACT

A rod guide member includes a base portion having integral attachment means for securement to a sheet metal panel and a pair of integral legs which receive a rod member therebetween. One leg member is thicker than the other to withstand lateral loads imposed thereon by the rod member. The other leg has flexible extensions which engage the rod member and bias the rod member into engagement with ribs on the one leg member.

8 Claims, 2 Drawing Sheets

ROD GUIDE MEMBER

BACKGROUND OF THE INVENTION

This invention relates generally to rod guide members and more particularly to a rod guide member which can guide linear and lateral movement of a rod member relative to a support while maintaining the rod member and support in rattle free relationship to each other.

Rod guide members are commonly used in vehicles to guide the movement of rod members relative to a support while maintaining the rod members in spaced relationship to the support. The rod members connect operators, such as door handles or key cylinders, with operated mechanisms such as door latches. The rod members are located in close proximity to the panels of the door and to other mechanisms within the door. Therefore, it is necessary to prevent contact between the rod members and the door panels and other mechanisms while guiding movement of the rod members when the operators are operated. Such movement can be linear or a combination of both linear and lateral movement depending on the motion of the operator.

One feature of the guide member of this invention is that it guides linear movement and controls movement of a rod member relative to a support while maintaining the rod member and support in rattle free relationship to each other. Another feature is that the guide member can withstand high lateral loads imposed thereon by the rod member during lateral movement of the rod member relative to the support. A further feature is that the guide member can guide the movement of a plurality of adjacent rod members while maintaining such rod members in rattle free relationship to the support and to each other.

In the preferred embodiment of the invention, the guide member includes a base portion and a pair of integral leg members extending laterally to the base portion in spaced relationship to each other in a generally U-shaped pattern. One of the leg members is thicker than the other so as to be relatively rigid. The inner surface of the one leg member includes a plurality of adjacent arcuate linear ribs extending transverse of the leg member. The ribs tangentially engage the annular surface of the rod member and guide linear movement of the rod member transverse of the one leg member while resisting any bending movement of the one leg member relative to the base portion under lateral loads imposed thereon by the rod member. The other leg member is thinner than the one leg member and located in juxtaposed spaced relationship to the one leg member and to the rod member. The other leg member includes a plurality of flexible extensions which extend toward the base portion and have rounded or annular terminal edge portions. The edge portions flexibly engage the rod member to resiliently hold the rod member in engagement with the ribs of the one leg member. The guide member is installed on the support through cooperating interengageable portions of the guide member received within openings in the support. The guide member is oriented so that the one leg member is the one subjected to lateral loading when the rod member is moved linearly and laterally by the operator. When the rod member moves linearly or both linearly and laterally, the flexible extensions maintain the rod member in engagement with the ribs of the one leg member and prevent movement of the rod member outwardly from within the leg members while maintaining the rod member in rattle free relationship to the support and any adjacent rod member. The rod guide member can be duplicated in a side by side pattern to accommodate adjacent side by side rod members.

The features of the rod guide member will be readily apparent from the following specification and drawings wherein.

Figure 1:
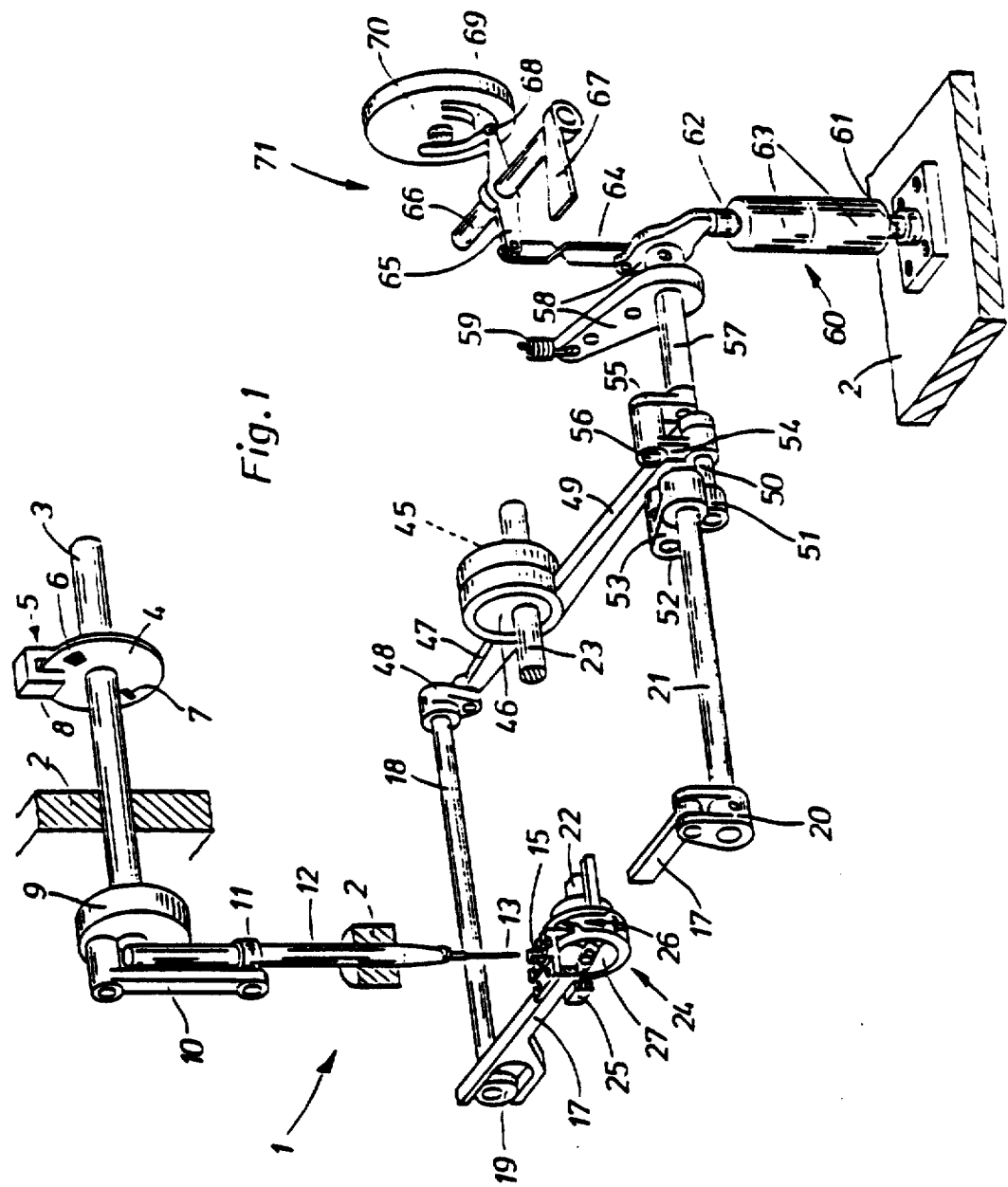
FIG. 1 is a plan view of a guide member according to this invention installed on a support for guiding lateral and linear movement of a rod member.
Figure 2:
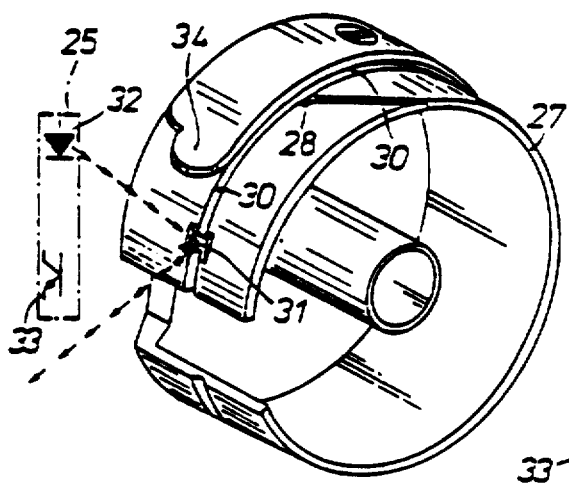
FIG. 2 is a sectional view taken generally along line 2—2 of FIG. 1.

Referring now to FIGS. 1 and 2 of the drawing, a rod guide member designated generally 10 is shown mounted on a support 12 for guiding linear and lateral movement of a rod member 14 relative thereto. One end of the rod member 14 is pivotally connected in a conventional manner to one end of a lever 16 which is pivotally mounted on support 12 and rotated by an operator, not shown, such as a conventional door handle, either internal or external, or a key cylinder, or a slidable door release member. Lever 16 is conventionally located in a non-operating position by a spring 18 and a suitable stop, not shown. The other end of the rod member 14 is conventionally connected to an operated mechanism, such a door latch so as to release the door latch when the rod member is shifted or moved laterally and linearly by the operator.

The rod guide member 10 includes a base portion 20 having a circular portion 22 and an overlying linear transverse or diametrical portion 24 integral therewith. A pair of lugs or ears 26 extend diametrically oppositely of each other on the lower surface of the circular portion 22, with the terminal end portions of the ears 26 extending radially outwardly of the edge of the base portion 20 in spaced underlying aligned relationship to portion 24 to define a groove 28 therebetween. The ears 26 are cored through for ease of molding and material saving. Flaps 30 of portion 24 extend radially outwardly of the ends thereof and radially outwardly of the ends of ears 26. The flaps 30 are molded in a downwardly biased position, toward ears 26.

The support 12 is provided with a circular opening 32, of the general size of the circular portion 22 of the guide member 10, and including a pair of diametrically opposite extension openings 34. To mount the guide member 10 to the support 12, the circular portion 22 is fitted within the opening 32 with the ears 26 being received within the extension openings 34 and the portion 24 and flaps 30 resting on the upper surface of the support 12. The guide member 10 is then rotated 90° to its position shown in FIGS. 1 and 2. During this movement, the grooves 28 receive the edge portion of the support 12 therein as the ears 26 move relative to the lower surface of the support 12, the portion 24 and flaps 30 move relative to the upper surface of support 12 and the portion 22 moves within the opening 32. The downward bias of flaps 30 against the upper surface of support 12 maintains the guide member 10 in rattle free engagement with support 12. Further, the leading edges of ears 26 may be ramped to facilitate initial rotational movement of the ears 26 from openings 34 into engagement with the lower surface of support 12.

The portion 24 includes a pair of outwardly or laterally extending legs 36 and 38 arranged in U-shaped fashion, with the leg 36 being much thicker and more rigid than the leg 38. The leg 36 includes three integral spaced arcuate or rounded ribs 40 on the inner surface thereof which extend transversely or laterally of the leg. The ribs 40 tangentially engage the rod member 14, as shown, and resist movement of the rod member outwardly of or longitudinally of the leg 36. The leg 36 is cored through for ease of molding and material saving. The leg 38 includes a pair of integral spaced flexible extensions 42 which extend inwardly thereof toward the base of leg 36 and terminate in rounded ends or terminals 44. The distance between the rounded terminals 44 is less than the diameter of the rod member 14 so that the terminals tangentially engage the rod member and resiliently bias it into engagement with the ribs 40.

When the lever 16 is rotated counterclockwise by the operator, not shown, against the bias of spring 18, the rod member 14 moves linearly to the left and also moves laterally downwardly due to the rotational arc of the lever 16. Since the thicker rigid leg 36 is located below the thinner leg 38, it receives and resists the lateral force of the rod member 14 as the rod member moves through the guide member 10. The flexible extensions 42 resiliently bias the rod member 14 into tangential engagement with the ribs 40 and resist movement of the rod member longitudinally of the legs 36 and 38 or outwardly thereof. The tangentially engagement of the rod member with the ribs 40 and rounded terminals 44 facilitates movement of the rod member 14 relative thereto and minimizes the friction between the guide member 10 and rod member 14. By molding the guide member 10 of plastic material having a self-lubricating or minimal friction property, the friction between the rod member and the guide member can be further minimized.

Figure 3:
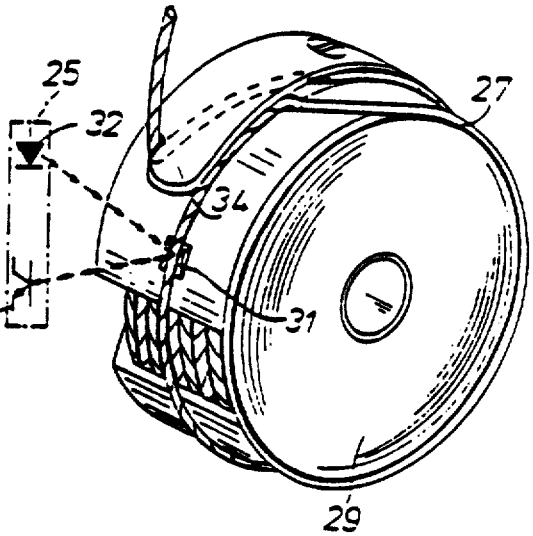
FIG. 3 is a view similar to FIG. 1 showing a duplicated rod guide member.
Figure 4:
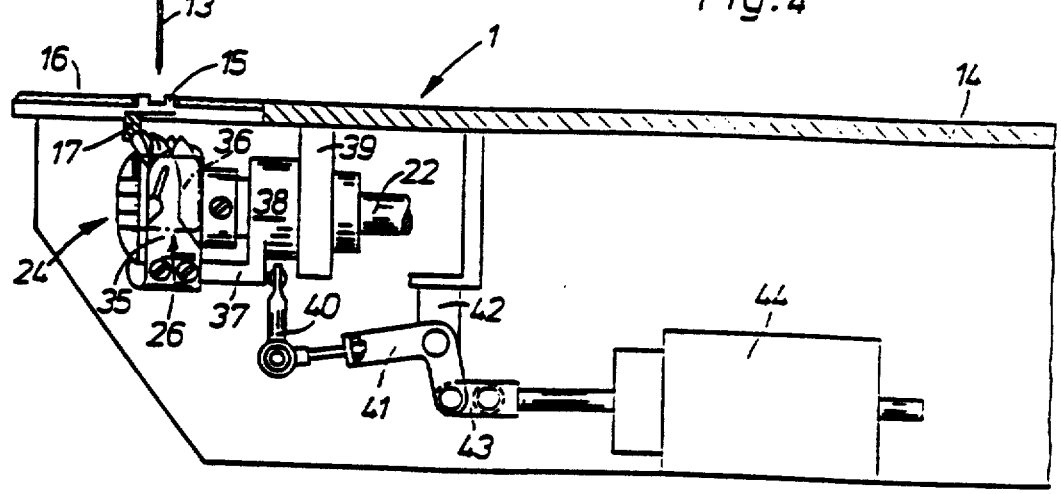
FIG. 4 is a sectional view taken generally along line 4—4 of FIG. 3.
Figure 1:
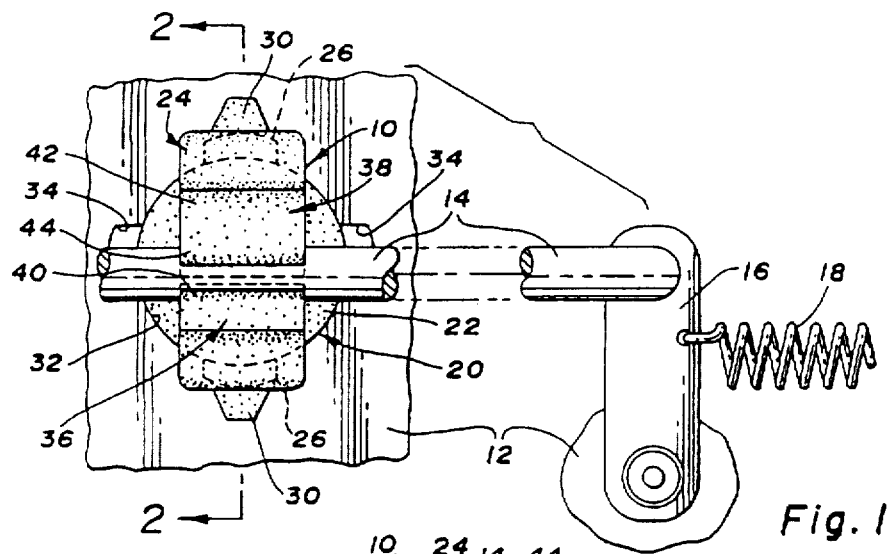
Figure 2:
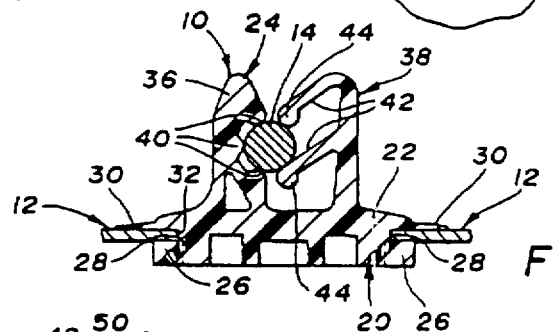
Figure 3:
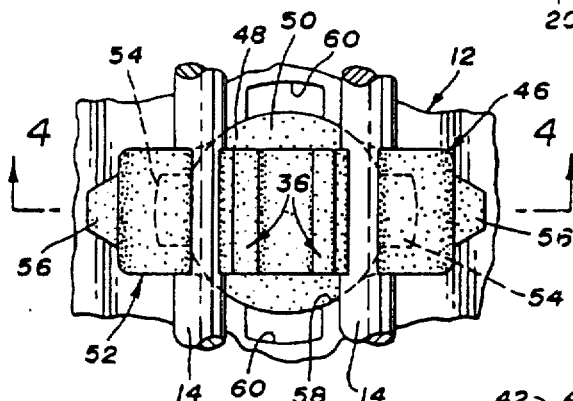
Figure 4:
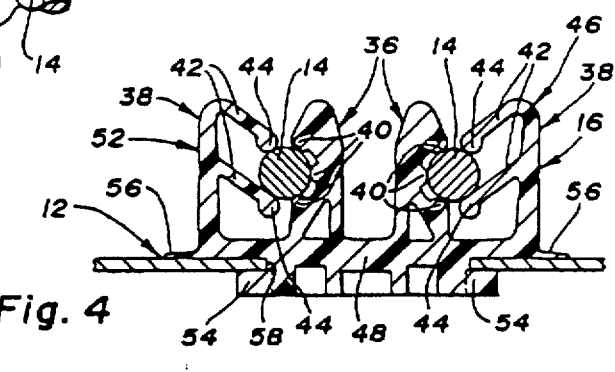

FIGS. 3 and 4 show a duplicated rod guide member 46 which is similar in many respects to the single rod guide member 10 shown in FIGS. 1 and 2. Therefore, like numbers have been used for like parts. The guide member 46 includes a base portion 48 having a circular portion 50, like circular portion 22, and an integral overlying linear transverse or diametrical portion 52, of greater length than portion 24. The guide member 46 is mounted to the support 12 in the same manner as guide member 10, through ears 54 and flaps 56 of the guide member, and opening 58 and extension openings 60.

The portion 52 includes a pair of integral guide members, having their thicker more rigid legs 36 in adjacent juxtaposed relationship to each other. Each such leg 36 cooperates with a leg 38 to resiliently retain and guide a rod member 14 relative thereto.

Thus this invention provides an improved rod guide member which guides linear and lateral movement of a rod member relative thereto and to a support while maintaining the rod member in rattle free relationship to the support and to any adjacent rod members.

The embodiments of the invention in which an exclusive property or privilege is claimed are defined as follows:

1. In combination with a support and a rod member movable linearly and laterally relative to the support, a rod guide clip for locating the rod member in predetermined spaced rattle free relationship to the support, permitting linear movement, and controlling lateral shifting movement of the rod member relative to the support, comprising, in combination, a base portion, attachment means for mounting the base portion to the support, first leg means extending from the base portion and having retaining means thereon engageable by the rod member to retain the rod member against movement outwardly of the first leg means and to guide linear shifting movement of the rod member relative thereto, the first leg means having sufficient lateral rigidity to withstand loads imposed laterally thereagainst by the rod member during lateral shifting movement of the rod member relative to the support, second leg means extending from the base portion in juxtaposed spaced relationship to the first leg means and rod member, and flexible means on the second leg means engageable with the rod member to resiliently hold the rod member in engagement with the retaining means on the first leg means.

2. The combination recited in claim 1 wherein the retaining means on the first leg means includes a plurality of spaced adjacent ribs, the rod member being held in engagement with the spaced adjacent ribs by the flexible means.

3. The combination recited in claim 1 wherein the flexible means on the second leg means includes a plurality of resilient ribs extending from the second leg means toward the base portion and being engageable with the rod member to resiliently bias the rod member into engagement with the retaining means on the first leg means.

4. The combination recited in claim 1 wherein the retaining means includes a plurality of spaced arcuate ribs located in an arcuate pattern around the rod member, the rod member being biased into tangential engagement with the ribs by the flexible means.

5. In combination with a support and a rod member movable linearly and laterally relative to the support, a rod guide clip for locating the rod member in predetermined spaced anti-rattle relationship to the support, permitting linear movement, and controlling lateral shifting movement of the rod member relative to the support, comprising, in combination, a base portion, attachment means for mounting the base portion to the support, first leg means extending from the base portion and including a pair of arcuate ribs tangentially engageable by the rod member to permit linear shifting movement of the rod member relative thereto and resist movement of the rod member laterally of the ribs and outwardly of the first leg means, the first leg means having sufficient lateral rigidity to resist bending of the first leg means relative to the base portion under lateral loads imposed thereagainst by the rod member during lateral shifting movement of the rod member relative to the support, second leg means extending from the base portion in juxtaposed spaced relationship to the first leg means and rod member, and integral flexible spaced extensions extending from the second leg means toward the base portion and flexibly engaging the rod member to resiliently bias the rod member into engagement with the arcuate ribs to cooperate therewith in resisting movement of the rod member laterally of the ribs and outwardly of the first leg means.

6. The combination recited in claim 5 wherein the first and second leg means are integral with the base portion.

7. The combination recited in claim 6 wherein the extensions include arcuate terminal portions engaging the rod member to resiliently bias the rod member against the arcuate ribs.

8. The combination recited in claim 7 wherein the arcuate terminal portions of the extensions are spaced apart less than the diameter of the rod member and tangentially engage the rod member.

* * * * *

UNITED STATES PATENT AND TRADEMARK OFFICE
CERTIFICATE OF CORRECTION

PATENT NO. : 5,074,676　　　　　　　　　　　　　　Page 1 of 3

DATED : December 24, 1991

INVENTOR(S) : Fannon et al

It is certified that error appears in the above-identified patent and that said Letters Patent is hereby corrected as shown below:

The title page showing the illustrative figure should be deleted to be replaced with the attached title page.

Sheet 1 of the drawings, consisting of Figs. 2-4, should be deleted to be replaced with the sheet of drawings, consisting of Figs. 1-4, as shown on the attached page.

Signed and Sealed this

Ninth Day of June, 1992

Attest:

DOUGLAS B. COMER

Attesting Officer　　　　Acting Commissioner of Patents and Trademarks

United States Patent
Fannon et al.

Patent Number: 5,074,676
Date of Patent: Dec. 24, 1991

[54] ROD GUIDE MEMBER

[75] Inventors: Joseph P. Fannon, Washington; Darryl Marbury, Detroit, both of Mich.

[73] Assignee: General Motors Corporation, Detroit, Mich.

[21] Appl. No.: 623,322

[22] Filed: Dec. 6, 1990

[51] Int. Cl.⁵ ........................... F16C 29/02
[52] U.S. Cl. ........................... 384/10; 384/42
[58] Field of Search ............ 384/10, 42, 37, 41, 384/23, 38

[56] References Cited
U.S. PATENT DOCUMENTS 3,720,449  3/1973  Godin .................. 384/10
4,138,176  2/1979  Cowdroy ............... 384/23
4,705,491  11/1987 Anderson .............. 384/10
4,761,081  8/1988  Mulford .............. 384/42

Primary Examiner—Lenard A. Footland
Attorney, Agent, or Firm—Herbert Furman

[57] ABSTRACT

A rod guide member includes a base portion having integral attachment means for securement to a sheet metal panel and a pair of integral legs which receive a rod member therebetween. One leg member is thicker than the other to withstand lateral loads imposed thereon by the rod member. The other leg has flexible extensions which engage the rod member and bias the rod member into engagement with ribs on the one leg member.

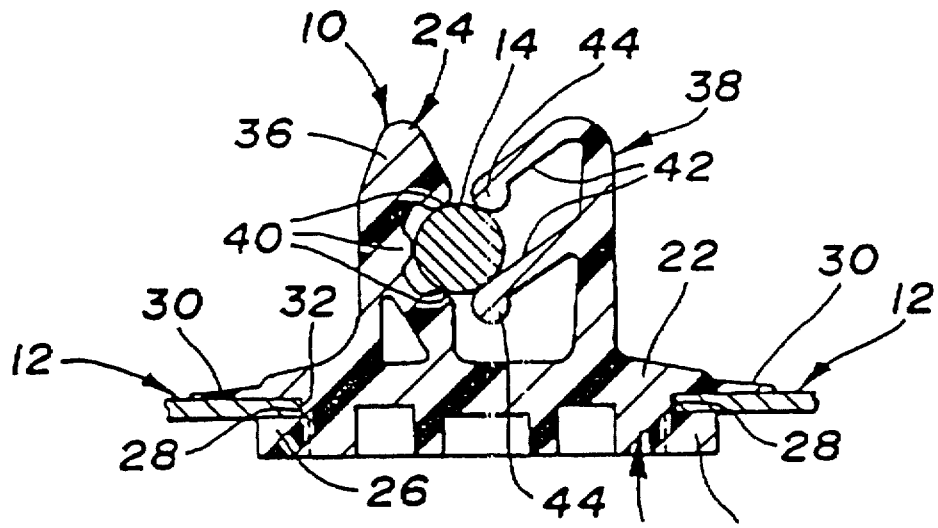

8 Claims, 2 Drawing Sheets